(12) United States Patent
Scholze et al.

(10) Patent No.: US 10,360,042 B2
(45) Date of Patent: Jul. 23, 2019

(54) METHOD FOR LOADING EXECUTABLE PROGRAM INSTRUCTIONS INTO A CHIP CARD DURING ACTIVE OPERATION

(71) Applicant: BUNDESDRUCKEREI GMBH, Berlin (DE)

(72) Inventors: Steffen Scholze, Berlin (DE); Matthias Schwan, Berlin (DE); Frank Muller, Berlin (DE); Klaus-Dieter Wirth, Berlin (DE); Elke Filzhuth, Berlin (DE)

(73) Assignee: BUNDESDRUCKEREI GMBH, Berlin (DE)

( * ) Notice: Subject to any disclaimer, the term of this patent is extended or adjusted under 35 U.S.C. 154(b) by 163 days.

(21) Appl. No.: 15/514,220

(22) PCT Filed: Oct. 1, 2015

(86) PCT No.: PCT/EP2015/072746
§ 371 (c)(1),
(2) Date: Mar. 24, 2017

(87) PCT Pub. No.: WO2016/055358
PCT Pub. Date: Apr. 14, 2016

(65) Prior Publication Data
US 2017/0277546 A1    Sep. 28, 2017

(30) Foreign Application Priority Data
Oct. 10, 2014    (DE) .................. 10 2014 220 616

(51) Int. Cl.
*G06F 9/44*    (2018.01)
*G06F 8/65*    (2018.01)
(Continued)

(52) U.S. Cl.
CPC .......... *G06F 9/4406* (2013.01); *G06F 3/0622* (2013.01); *G06F 3/0632* (2013.01);
(Continued)

(58) Field of Classification Search
CPC .... G06F 9/4406; G06F 8/654; G06F 12/1458; G06F 12/1408; G06F 3/0632; G06F 3/0622
See application file for complete search history.

(56) References Cited

U.S. PATENT DOCUMENTS 8,894,485 B2 *  11/2014  Caldas ................ G07F 17/3244
                                                   463/29
9,904,557 B2 *  2/2018  Buhler ................. G06F 21/575
(Continued)

FOREIGN PATENT DOCUMENTS

DE      102011111698 A1    2/2013
DE   10 2012 012 509 A1   12/2013
(Continued)

OTHER PUBLICATIONS

European Office Action dated Mar. 27, 2018 for corresponding European Application No. 15778904.1.
(Continued)

*Primary Examiner* — Stefan Stoynov
(74) *Attorney, Agent, or Firm* — Harness, Dickey & Pierce, P.L.C.

(57) ABSTRACT

The method includes authenticating a chip card terminal to a chip card by a chip card operating system, verifying the authorization of the chip card terminal to load executable program instructions by the chip card operating system, storing data in a predefined memory region of the NVM, which data indicate a successful execution of the authentication and the verification, by the chip card operating system, starting execution of a boot loader by the chip card
(Continued)

Figure 1:
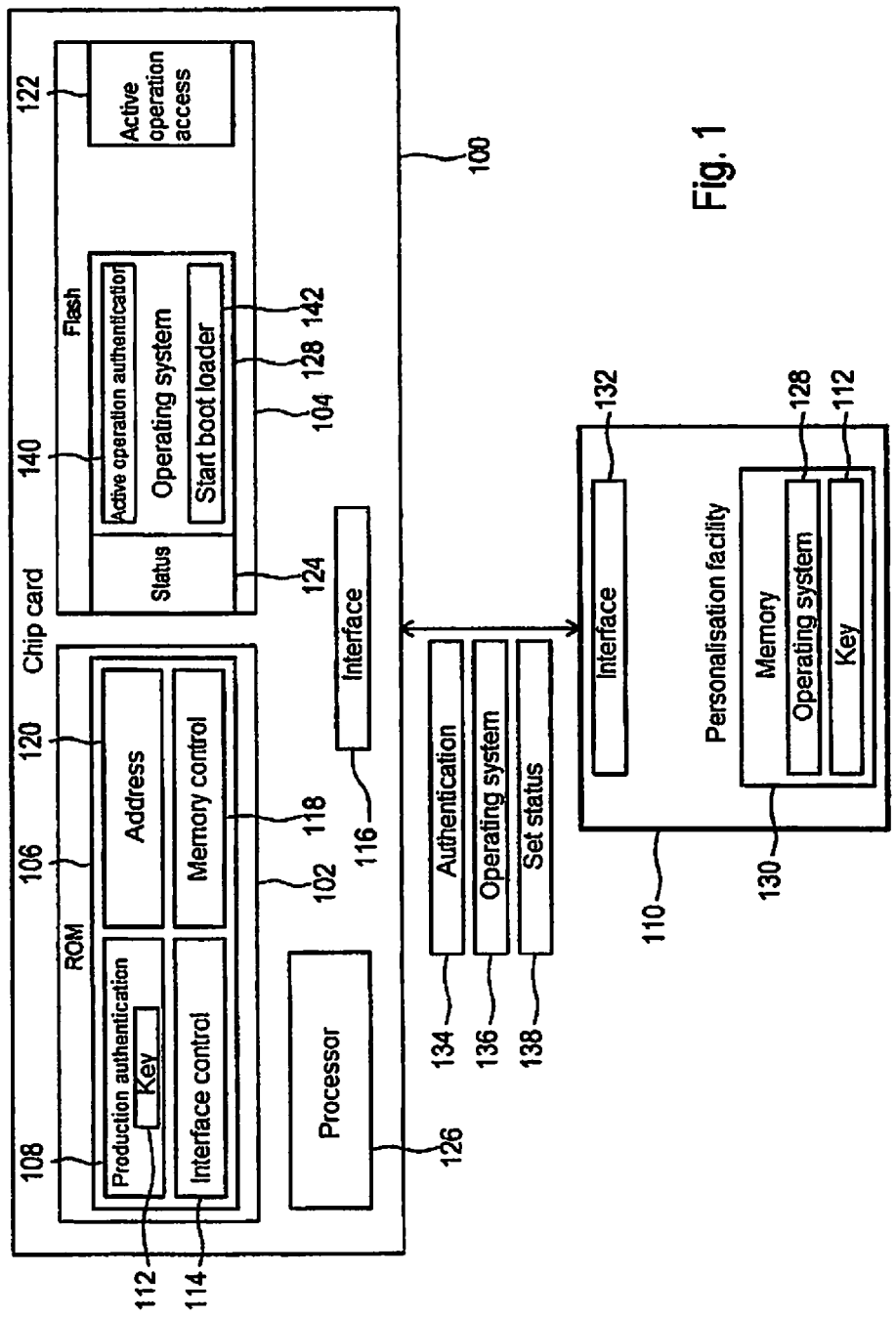

operating system and interrupting the execution of the chip card operating system following the start of the boot loader, reading the data from the predefined memory region by the boot loader, loading the program instructions from the chip card terminal into the NVM by the boot loader on the precondition that the data indicate the successful authentication and verification in the predefined memory region.

19 Claims, 3 Drawing Sheets

(51) Int. Cl.
    *G06F 12/14*     (2006.01)
    *G06F 3/06*     (2006.01)
    *G06F 9/4401*     (2018.01)
    *G06F 8/654*     (2018.01)

(52) U.S. Cl.
    CPC .......... *G06F 8/654* (2018.02); *G06F 12/1408* (2013.01); *G06F 12/1458* (2013.01); *G06F 2212/402* (2013.01)

(56) References Cited

U.S. PATENT DOCUMENTS

2013/0227262 A1*   8/2013   Maya .................... G06F 21/575
                                                                                  713/2
2014/0025940 A1    1/2014   Giraud et al.

FOREIGN PATENT DOCUMENTS

| EP | 2590383 A1 | 5/2013 |
|---|---|---|
| EP | 2634693 A1 | 9/2013 |
| WO | WO-2014/023394 A1 | 2/2014 |

OTHER PUBLICATIONS

International Search Report PCT/ISA/210 for International Application No. PCT/EP2015/072746 dated Jan. 13, 2016.
Written Opinion of the International Searching Authority PCT/ISA/237 for International Application No. PCT/EP2015/072746 dated Jan. 13, 2016.
International Preliminary Report for PCT Application No. PCT/EP2015/072746 dated Apr. 20, 2017.
European Office Action dated Oct. 12, 2018 in corresponding European Patent Application No. 15 778 904.1.

* cited by examiner

METHOD FOR LOADING EXECUTABLE PROGRAM INSTRUCTIONS INTO A CHIP CARD DURING ACTIVE OPERATION

The invention relates to a method for loading executable program instructions into a chip card during active operation and to a corresponding chip card and an electronic system comprising a chip card terminal.

The use of what is known as a boot loader, which is also referred to as a "bootstrap loader", is known from the prior art in order to load the chip card operating system into the modifiable non-volatile memory (for example based on EEPROM or flash-EEPROM technology) of the chip card. With the aid of the boot loader, the chip card operating system can be loaded to the corresponding memory address of the modifiable non-volatile memory (also referred to as an NVM for short).

The boot loader is located in the non-modifiable fixed memory of the chip card (usually referred to as the ROM or "read only memory"), which usually also contains the program of the hardware test for the chip of the chip card, wherein the boot loader is introduced into the ROM with the aid of a ROM mask (in this regard see the "Handbuch der Chipkarten" ("The Chip Card Handbook"), Wolfgang Rankl, Wolfgang Effing, Carl Hanser Verlag Munchen, 2008, p, 493 under 13.5.1 and p. 622 under 14.3.3).

The boot loader is used in the prior art only for the initial loading of the chip card operating system into the NVM during the production or initialisation of the chip card in a secure environment and is then deactivated for the entire service life of the chip card. A modification or an upgrade of the chip card operating system or a download of executable program instructions into the NVM of the chip card by means of the boot loader in the ROM is not provided in the prior art (usually for security reasons), since boot loaders according to the prior art do not contain sufficiently secure mechanisms for the introduction of program instructions during active operation of the chip card operating system and therefore would not be sufficiently certified for example for government applications and/or the introduction of malware would be made possible.

By contrast, the object of the invention is to create a method for loading executable program instructions into a chip card, during active operation, without thereby compromising the security of the chip card, as is necessary for example for government applications and/or for payment transactions.

The object forming the basis of the invention is achieved by the features of the independent claims. Embodiments of the invention are specified in the dependent claims.

The "active operation" of a chip card is understood to mean the state of a chip card which has left a production environment after personalisation, in particular the loading of the chip card operating system and other data, and which for example has already transferred from what is known as the first-use state into the used state; see DE 10 2007 041370 A1 in this regard.

A "personalisation facility" is understood here to mean an apparatus forming part of a chip card production installation, to which chip card blanks are fed in order to be personalised, in particular as a result of the initial loading of the chip card operating system with the aid of the boot loader of the chip card and the storing of further personalisation data. This personalisation data can include textual information, image data, biometric data of the future owner of the chip card, such as fingerprint data or iris scan data, cryptographic keys and other data requiring protection, that is to say in particular attributes in respect of the owner, the issuer of the chip card, or the chip card itself.

Embodiments of the invention are particularly advantageous since the loading of executable program instructions is made possible during active operation of the chip card without hereby compromising the security of the chip card, as is essential in particular for government applications.

Here, it is also particularly advantageous that the boot loader of the chip card located in the ROM is used for the loading of the executable program instructions without the boot loader having to be tailored to the chip card operating system located in the NVM and the program instructions to be downloaded therefor. This is made possible in that the chip card operating system initially loaded into the NVM by means of the boot loader has an authentication function which serves to authenticate a chip card terminal from which the executable program instructions are to be loaded during active operation of the chip card. Once this authentication has been successfully performed, the chip card operating system writes corresponding data into a predefined memory region. Only then does the chip card operating system start the boot loader, whereby the running of the chip card operating system ends simultaneously. The boot loader then accesses a predefined memory region in order to check whether the previous authentication of the chip card terminal by the chip card operating system has been performed successfully. If so, the executable program instructions can then be loaded.

This has the particular advantage that the boot loader itself does not need to have an authentication function for authentication of the chip card terminal. This has the particular advantage of the flexibility to adapt the authentication function of the chip card operating system for example to the application in question and/or increased security requirements, for example in that the executable program instructions to be downloaded include an upgrade of the authentication function of the chip card operating system, for example for subsequent chip card operating system updates.

Since the authentication of the chip card terminal is not performed by the boot loader itself, which is stored in non-modifiable form in the ROM, and instead this authentication function is implemented in the chip card operating system, which can be modified by downloading executable program instructions, this authentication function is also modifiable and can be adapted to altered surroundings or security requirements.

A further particular advantage here is that a generic boot loader can be used for various chip card operating systems from different manufacturers, since the specific manifestation of the authentication function required by a particular application of the chip card is implemented in the corresponding chip card operating system. The outlay involved in having to produce a boot loader adapted to the particular application and/or chip card operating system with a separate ROM mask in each case in order to separately enable the download during active operation for any chip card operating system is thus avoided.

In accordance with embodiments of the invention, the executable program instructions are an upgrade of the chip card operating system, i.e. what is known as an operating system update. Corresponding program instructions of the previously loaded chip card operating system are replaced or deactivated by the executable program instructions. Alternatively, the executable program instructions form an updated or alternative chip card operating system, which overwrites the initially loaded chip card operating system or which is stored in the NVM in addition to the currently active chip card operating system. Depending on the embodiment, this process can be carried out repeatedly within a period of use, for example the period of validity, of a chip card, for example in order to carry out operating system updates at regular or irregular intervals.

The executable program instructions to be downloaded by way of example can implement a cryptographic protocol in such a way that a higher level of security in terms of the execution is ensured compared to that enabled by the implementation provided by the existing program instructions to be replaced. By way of example, the length of the used keys can be increased for this purpose, or another cryptographic method or another cryptographic algorithm can be defined.

This is particularly advantageous for government identity documents, such as electronic identity cards or passports, which generally have a relatively long period of validity of up to ten years. Embodiments of the invention make it possible to carry out one or more updates of the chip card operating system during this period of validity as a result of the downloading of program instructions, so as to take into consideration the current security requirements, wherein the user does not require a new ID document for this purpose, since on the one hand all data from the personalisation of the ID document can be retained and on the other hand the functional behaviour of the chip card operating system meets the expectations of the corresponding readers.

In accordance with embodiments of the invention, the chip card is formed as a document, in particular as a document of value or security document, wherein the document has a secured memory region for storing at least one attribute and a communications interface for reading the attribute, wherein the chip card operating system has a cryptographic function for executing a cryptographic access protocol, the successful execution of which is a necessary precondition for external read access to the attribute. This cryptographic function is preferably implemented by the same authentication function of the chip card operating system, which is thus used both for the authentication of the chip card terminal for the downloading of program instructions and for the authentication of a chip card terminal in order to read the attributes, for example at a border control.

In accordance with embodiments of the invention, the document is a paper-based and/or plastic-based document, for example an electronic identity document, in particular a passport, identity card, visa, driver's license, vehicle registration document, vehicle title, company identification document, health insurance card, or another ID document, or a chip card, a means of payment, in particular a banknote, bank card or credit card, a consignment note, or another proof of authority, comprising an integrated data memory for storing the at least one attribute.

In accordance with embodiments of the invention, the executable program instructions are loaded from a chip card terminal which has a mechanical feed point for inserting the chip card into the chip card terminal, more specifically also if the chip card and the chip card terminal have a wireless interface, for example an RFID or an NFC interface. The advantage of such a mechanical feed point is specifically that the chip card cannot be removed from the chip card terminal during the loading of the executable program instructions, and instead is only ejected and released again from the mechanical feed point and from the chip card terminal following the successful completion of the loading of the executable program instructions.

As a result, the chip card is prevented from being able to be removed from the chip card terminal during the loading of the executable program instructions, because otherwise the chip card might have a non-defined operating state, which on the one hand might provide the opportunity for an attack and on the other hand might lead to the failure of the chip card operating system.

Figure 2:
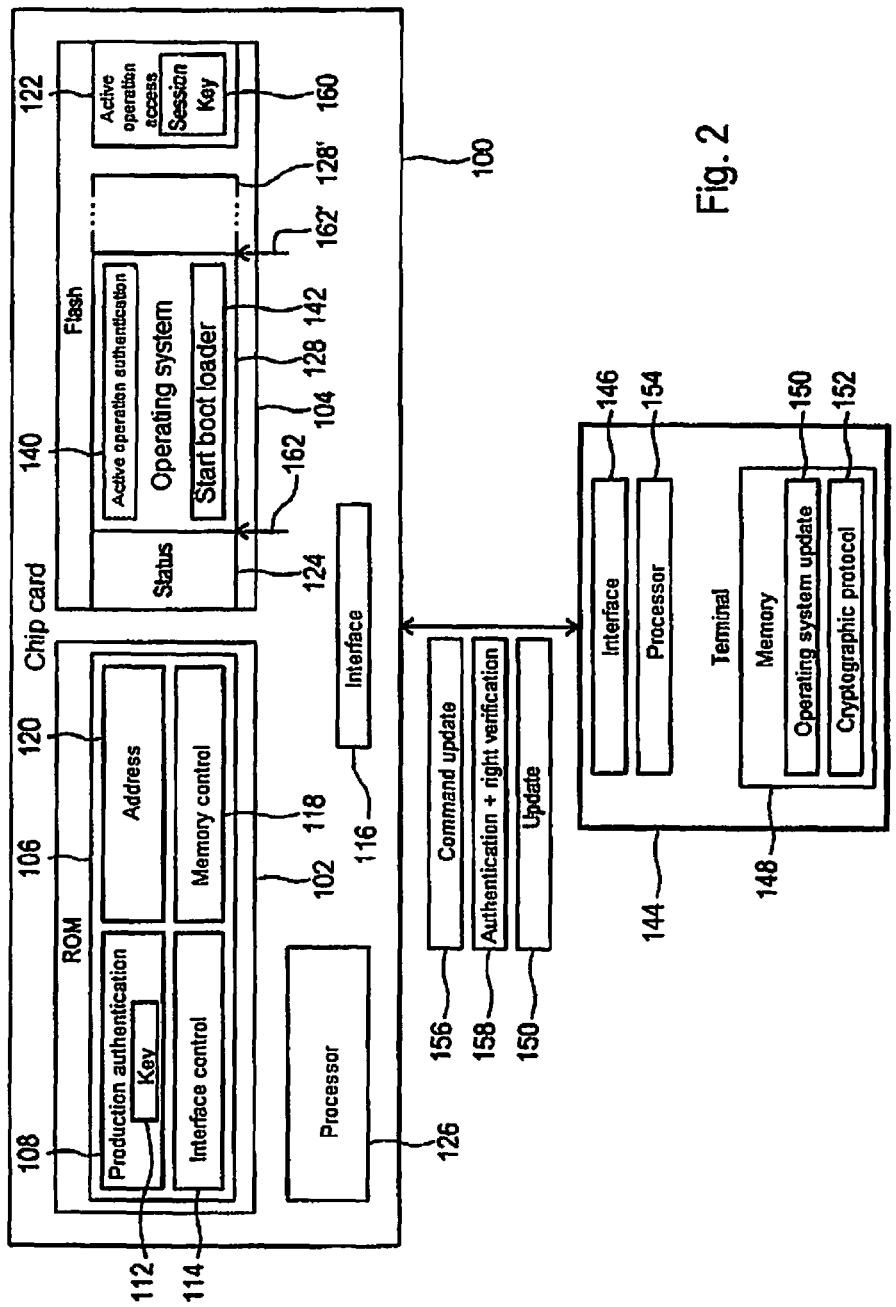
Figure 3:
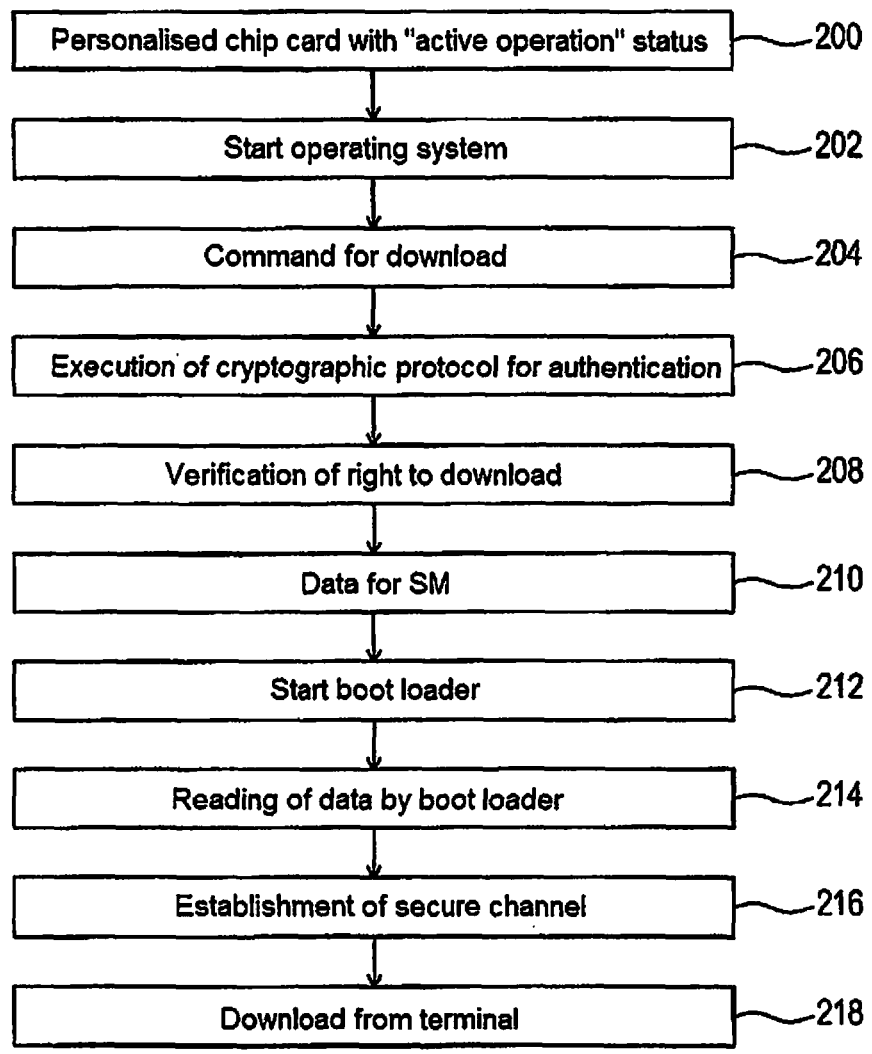

Embodiments of the invention will be explained hereinafter with reference to the drawings, in which:

FIG. 1 shows a block diagram of an embodiment of a chip card according to the invention in a production environment, FIG. 2 shows a block diagram of an embodiment of a chip card according to the invention during active operation, FIG. 3 shows a flow diagram of an embodiment of a method according to the invention.

Like or corresponding elements of the following embodiments are denoted hereinafter by identical reference signs.

FIG. 1 shows a chip card 100 having a ROM 102 and a non-volatile memory (NVM), for example an EEPROM, in particular what is known as a flash-EEPROM 104, which has a content which can be modified by means of a writing operation.

The ROM 102 includes a boot loader 106, which was introduced with the aid of what is known as a ROM mask during production of the chip containing the ROM 102. The boot loader 106 includes an authentication function 108 for authentication of a personalisation facility 110 so as to be able to initially store the chip card operating system in the NVM. By way of example, the authentication function 108 includes a symmetric key 112, which also has to be stored in the personalisation facility 110 so that it can authenticate itself to the boot loader 106. The key 112 can be stored wholly or partially in the ROM 102 and/or wholly or partially in the flash 104. The latter has the advantage that different keys can be used for the authentication for the same ROM masks.

The boot loader 106 also has an interface function 114 for controlling an interface 116 of the chip card 100 for the communication and data transfer between reader and chip card. The interface 116 can be a wireless interface, for example in accordance with an NFC or RFID standard, in particular a contactless interface according to ISO 14443, preferably with Very High Bit Rate (VHBR) support.

The boot loader 106 also has a memory function 118, which serves for access to the NVM 104, for example with the necessary hardware functionalities for addressing, deleting, writing and/or reading modifiable non-volatile memories, where appropriate with the support of a Memory Management Unit (MMU) (see the "Handbuch der Chipkarten", page 106 under 5.4.11).

In accordance with embodiments of the invention, the boot loader 106 is designed to process commands in the form of command APDUs, in particular according to ISO/IEC 7816-4.

An address 120 is also contained in the boot loader 106 and defines a predefined memory region 122 in the NVM 104, which the boot loader 106 can access if its status stored in the memory region 124 in the NVM 104 indicates the active operation of the chip card 100 and therefore the activated state of the boot loader 106.

The chip card 100 has a processor 126, wherein the processor 126 contains logic circuits, which can be provided in modules integrated in one or more discrete components or on the same chip and which serve, amongst other things, to execute the boot loader 106.

The chip card 100 is initially a non-personalised or pre-personalised chip card blank without chip card operating system. The initial loading of a chip card operating system 128 is performed in a production environment, which is particularly secured by an access control system, with the aid of the personalisation facility 110. On account of the inherently secure production environment, which is protected by the access control system against access by unauthorised third parties, a lower security level can be selected for the authentication function 108 of the boot loader 106 than for the downloading during active operation.

For this purpose, the key 112 by way of example is also stored in a memory 130 of the personalisation facility 110. The personalisation facility 110 has an interface 132 corresponding to the interface 116 in order to communicate with the chip card 100. By way of example, the personalisation facility 110 initially sends an authentication command 134 to the chip card 100, in order to start the boot loader 106, i.e. the authentication function 108 thereof. For authentication, the personalisation facility 110 then sends the key 112 to the chip card 100, for example.

By execution of the authentication function 108 by the processor 126, it is then checked whether the key 112 received from the personalisation facility 110 matches the key 112 of the authentication function 108 contained in the ROM mask. If so, the personalisation facility 110 is authenticated. In the next step, the personalisation facility 110 then sends a loading command 136 to the chip card 100, reads the chip card operating system 128 from its memory 130, and transfers it to the chip card 100, from where the chip card operating system 128 is then written into the NVM 104 by the memory function 118 of the boot loader 106.

Alternatively, an approach can also be adopted such that the chip card operating system 128 is encrypted symmetrically with the key 112, and the chip card operating system 128 is then decrypted by the authentication function 108. Since a decryption is possible only if the chip card operating system was encrypted using the appropriate symmetric key, it is possible in this case to dispense with a separate authentication step, since this is inherent to the decryption of the chip card operating system 128 by the boot loader.

Once the chip card operating system 128 and, as appropriate, further personalisation data has/have been loaded and therefore the chip card has been prepared for active operation, the personalisation facility 110 sends a status command 138 in order to set the status of the chip card 100 set in the memory region 124 to the status "active operation".

The chip card operating system 128 also contains a program launcher 142 in order to start the boot loader 106. Addresses for calling up the interface function 114 and the memory function 118 of the boot loader 106 for the chip card operating system 128 can also be stored in the flash 104, such that the chip card operating system 128 can call up these functions of the boot loader 106 during active operation and therefore does not need to have such functions itself, such that the resources of the chip card are efficiently used.

The authentication function 140 is selected so that it ensures a sufficiently strong authentication of a chip card terminal outside a secured access region, as is provided by a production environment. By way of example, the steps of a cryptographic protocol concerning the chip card 110 are implemented, said protocol being based on asymmetric cryptographic key pairs, for example a challenge-response protocol, a Diffie-Hellman protocol, an extended access control protocol (EAC) or a PACE protocol with what is known as terminal authentication (TA) and chip authentication (CA), see Technical Guideline TR-031110-2, Advanced Security Mechanisms for Machine Readable Travel Documents Part 2, Version 2.11, 20 Mar. 2012, Bundesamt für Sicherheit in der Informationstechnik (German Federal Office for Information Security).

In addition to the authentication, the authentication function 140 can also include an authorisation verification and the determination of one or more parameters for establishing secured communication, for example a session key for establishing a secure messaging (SM) channel.

FIG. 2 shows the chip card 100, which has been personalised in accordance with FIG. 1, during active operation. A chip card terminal 144 is used for the subsequent loading of executable program instructions, for example in order to upgrade the chip card operating system 128 or to replace this for another, i.e. for what is known as an operating system update.

The chip card terminal 144 has an interface 146 corresponding to the interface 116 of the chip card 100. The interface 146 is preferably a contactless interface in this case, in particular according to ISO 14443 with VHBR support. The interface 146 is preferably formed with a mechanical feed point in order to receive the chip card 100 fully in a housing of the chip card terminal 144, wherein this mechanical feed point can be formed similarly to known bank terminals for withdrawing cash.

The chip card terminal 144 has a memory 148, in which executable program instructions 150 are stored, such as an operating system update for updating the chip card operating system 128. The memory 148 also contains program instructions 152, by means of which those steps of a cryptographic protocol which concern the chip card terminal 144 and which are interoperable with the authentication function 140 of the chip card operating system 128 are implemented. The chip card terminal 144 has a processor 154 for executing these program instructions 152.

In order to carry out the operating system update, the following approach can be adopted:
1. The user inserts the chip card 100 into the mechanical feed point of the chip card terminal 144.
2. The chip card terminal 144 couples electrical energy via its interface 146 into the chip card 100. Since the status "active operation" is stored in the memory region 124, the chip card operating system 128, and not the boot loader 106, then starts.
3. The chip card terminal sends a command 156 to the chip card 100 in order to start the operating system update. The authentication function 140 of the operating system 128 is started as a result, and therefore the cryptographic protocol is executed in order to verify the authenticity of the chip card terminal 144, for which purpose the chip card terminal 144 exchanges data 158 with the chip card 100 accordingly.

Besides the authenticity of the chip card terminal 144, the right thereof to perform the operating system update is preferably verified. For this purpose, the chip card terminal 144 by way of example sends a digital certificate specifying its right to download executable program instructions, that is to say in this case the operating system update. On the basis of this certificate, it is possible for the chip card operating system 128, by means of the chip card, to verify whether the chip card terminal 144 has the authorisation necessary to download the program instructions.

By executing the authentication function 140 and the program instructions 152, one or more parameters is/are also determined which is/are necessary for secure communication, for example by means of a Diffie-Hellman key exchange or another method, with which a symmetric session key is determined, for example. On the precondition that the authentication and, as appropriate, the verification of the rights of the chip card terminal 144 have been successfully performed, the authentication function 140 then stores such a parameter or parameters, for example a symmetric session key 160, in the memory region 122. In addition, further data can be stored by the chip card operating system 128 in the memory region 120 in order to transfer this data to the boot loader 106. By way of example, this data can be the specification of the addresses in the flash 104 under which the program instructions received from the chip card terminal 144 are to be stored and/or an updated starting address 162' from where the program is to be executed with coupling of energy into the chip card 100 following the successful and complete download of the program instructions.

4. The chip card operating system 128 then starts the program launcher 142, so that the boot loader 106 is started. The execution of the chip card operating system 128 is hereby ended at the same time.

The boot loader 106 then firstly accesses the memory region 124. Since the information that the chip card 140 is in the "active operation" status, in which the boot loader normally cannot start since it is deactivated after the personalisation, is stored in the memory region 124, the boot loader 106 then accesses the address 120 in the memory region 122 so as to read data there that indicate the potentially successful authentication and rights verification. If such data are present there and the verification of said data was successful, the execution of the boot loader 106 is continued, otherwise it is interrupted.

By way of example, the boot loader 106 attempts to read the session key 160 from the address 120. Only if a session key 160 is located at the address 120 is the execution of the boot loader 106 continued.

A secured channel is then established between the boot loader 106 and the chip card terminal 144, for example in accordance with what is known as a secure messaging method. The session key 160 previously agreed between the chip card 100 and the chip card terminal 144 can be used for this purpose.

Alternatively or additionally, the boot loader 106 can use the session key 160 in order to authenticate the chip card terminal 144 in that the boot loader 106 checks whether the chip card terminal 144 has access to the correct session key 160, for example by means of a challenge-response method. Alternatively, a separate verification of this type can be spared, since only a valid session key 160 enables a receipt of the program instructions 150. This verification is therefore inherent to the transfer of the program instructions 150 over the secured channel.

The chip card terminal 144 then sends the operating system update with the program instructions 150 encrypted as appropriate with the session key 160 via the secure messaging channel to the boot loader 106, which decrypts the program instructions 150 and stores them in the flash 104. This can be implemented in that the initially loaded operating system 128 is overwritten wholly or partially by the program instructions 150 or in that the program instructions 150 are additionally written into the NVM 104. The program instructions 150 can be transferred here either in plain text or in the form of data specifying the program instructions 150.

By way of example, both the boot loader 106 and the chip card operating system 128 are certified for example in accordance with common criteria with sufficient security level, thus guaranteeing that they meet the security requirements for example for government documents. The chip card operating system updated by the download of the program instructions 150 is also certified accordingly, wherein it can be ensured that the accordingly certified updated chip card operating system has actually been introduced in the chip card 100 as a result of the download, since this is performed by the components that are certified for their part, that is to say the boot loader 106, the initially introduced chip card operating system 128, and the chip card terminal 144.

In accordance with embodiments of the invention, the additional following information can be transmitted from the chip card terminal 144 to the chip card 100 in conjunction with the authentication of the chip card terminal 144 by the authentication function 140 for administrative access to the chip card 100 for the purpose of downloading the program instructions 150:

administrative rights of the chip card terminal 144, that is to say for example which of the functions of the chip card operating system 128 may be replaced and which memory regions of the NVM 104 may be written to, information relating to the download itself, that is to say for example the version of the chip card operating system 128 from which the download is to be performed and the version of the chip card operating system 128 which will be provided after the download, additional information, for example a return address, in the chip card operating system 128 following the download, an updated address 120, if this is not static, in order to specify addresses and sizes of the memory region 122 for the boot loader 106 with specified data in the NVM 104 alternatively in a RAM of the chip card 110, and/or a key and algorithm for secure messaging and/or for the detection of successful authentication for the download and also configuration data for the accurate operation of the boot loader 106.

In accordance with embodiments of the invention, the chip card operating system 128 can provide the boot loader 106 with further data and parameters via the memory region 122, wherein the memory region 122, instead of the NVM 104, can be provided in a RAM of the chip card 100 and/or a register of the processor 126 and/or another non-volatile memory (NVM) and/or the MMU. The further data and/or parameters can be the following, by way of example:

in addition to the executable program instructions 150, parameter values for execution thereof, one or more memory addresses for the program instructions 150 in the NVM 104; for example each of the program instructions 150 can be assigned a memory address in the NVM 104 at which the relevant program instruction is to be stored, or blocks of program instructions can be combined, which in each case are to be written from an assigned memory address by the boot loader 106, an address in the NVM 104, from where the program instructions stored in the NVM 104 are to be executed during active operation of the chip card 100. By way of example, two different operating system versions of the chip card operating system 128 can be stored in the NVM 104, wherein this address then identifies the version of the two operating system versions that is actually to be executed.

The boot loader 106 can additionally have functions for calculating checksums via memory contents, which can be expressed as CRC and/or as hash function.

The boot loader can also have a function for setting the vector address of the chip card operating system 128, from which the program execution starts after coupling energy into the chip card during active operation. This starting address can be transferred to the boot loader via the memory region 122 during the start-up of the boot loader by the chip card operating system 128, so that the boot loader can write the new starting address in a predefined memory region, for example the NVM 104. In accordance with an embodiment of the invention, the boot loader 106 can be designed so that the parts of the chip card operating system 128 to be updated are not overwritten, but instead logical operations of current data of the chip card operating system 128 and the update delivered from the chip card terminal 144 are performed bit by bit, for example XOR, AND, OR or NOT operations.

The chip card 100 can have a secured memory region for storing at least one attribute and the interface 116 for reading the attribute, wherein the chip card operating system 128 or 128' has a cryptographic function for carrying out a cryptographic access protocol, the successful execution of which is a necessary precondition for external read access to the attribute. This cryptographic function can be provided by the authentication function 140, which thus serves also for authentication of a reader, for example for a border control.

FIG. 3 shows a flow diagram of an embodiment of a method according to the invention.

In step 200, the chip card 100 is inserted into the chip card terminal 144 and energy is coupled into the chip card so that the operating system 128 is started from a predefined starting address 162. The starting address 162 can be stored in a predefined non-volatile memory region of the chip card 100, which memory region is automatically accessed by the chip card 100 as soon as the energy is coupled into the chip card in order to start the execution of the chip card operating system 128 from this starting address 162.

In step 204, the chip card 100 receives the command 156 from the chip card term final 144 for the download of executable program instructions.

In step 206, a cryptographic protocol for authentication of the chip card terminal 144 and for verifying (step 208) whether the chip card terminal 144 has the access rights necessary for the download of the program instructions is then started, for which purpose the data 158 are exchanged between the chip card terminal 144 and the chip card 100 in order to execute the relevant cryptographic protocol.

A session key 160, which is written by the chip card operating system 128 into the memory region 122, is also agreed on the basis of the execution of the cryptographic protocol. In addition, the chip card operating system can also write further data before it starts the boot loader in step 212 with the aid of the program launcher 142.

For example, this data can be data which specify addresses in the NVM 104 under which the program instructions 150 are to be written and/or an updated starting address 162', from which the execution of the program code stored in the NVM 104 is to start.

By way of example, the program instructions 150 contain a new version of the chip card operating system 128, that is to say the current version of the chip card operating system 128', which is to be written in the NVM 104 after the chip card operating system 128. Accordingly, the starting address 162 must be updated to the starting address 162' (see FIG. 2), so that, in the event of the next start-up process, the program is started from this updated starting address and therefore the new version of the chip card operating system 128' is executed instead of the previous version.

After the start of the boot loader 112 by the chip card operating system 128, the boot loader accesses the memory region 122 and reads the data contained therein in step 214. In step 216, a secure channel is then established between the chip card 100 and the chip card terminal 144, for example with the aid of the session key 160, and data which specify the program instructions 150 are loaded from the chip card terminal 140 in step 218.

This data can be directly the program instructions 150 themselves or—depending on the embodiment—data from which these program instructions 150 can be derived by the chip card 100, for example in that these data are linked by logical operations to the program instructions of the chip card operating system 128 by the boot loader 106 so that the updated program instructions 150 are provided as the result of these logical operations.

LIST OF REFERENCE SIGNS 100 chip card
102 ROM
104 NVM
106 boot loader
108 authentication function
110 personalisation facility
112 key
114 interface function
116 interface
118 memory function
120 address
122 memory region
124 memory region
126 processor
128 chip card operating system
128' chip card operating system
130 memory
132 interface
134 authentication command
136 loading command
138 status command
140 authentication function
142 program launcher
144 chip card terminal
146 interface
148 memory
150 program instructions
152 program instructions
154 processor
158 data
160 session key
162 starting address
162' starting address

The invention claimed is:

1. A method for loading executable program instructions into a chip card during active operation, wherein the chip card has at least one ROM and one NVM, wherein a boot loader for loading a chip card operating system from a personalisation facility into the NVM before initiation of active operation of the chip card is stored in the ROM and the chip card operating system is stored in the NVM, and wherein the boot loader is in a deactivated state during active operation of the chip card, wherein the boot loader in its deactivated state can be started only by the chip card operating system, wherein the method comprises:

coupling energy into the chip card from a chip card terminal;

starting the execution of the chip card operating system stored in the NVM by the chip card;

receiving a command from the chip card terminal to load the executable program instructions by the chip card operating system;

authenticating the chip card terminal to the chip card by the chip card operating system;

verifying the authorisation of the chip card terminal to load the executable program instructions by the chip card operating system;

storing data in a predefined memory region of the NVM, which data indicate a successful execution of the authentication and the verification, by the chip card operating system;

starting the execution of the boot loader by the chip card operating system and interrupting the execution of the chip card operating system following the start of the boot loader;

reading the data from the predefined memory region by the boot loader; and loading the program instructions from the chip card terminal into the NVM by the boot loader on the precondition that the data in the predefined memory region indicate the successful authentication and verification.

2. The method according to claim 1, wherein the executable program instructions are loaded into the NVM in order to upgrade the chip card operating system stored in the NVM.

3. The method according to claim 1, wherein another chip card operating system which replaces the chip card operating system stored in the NVM for active operation is formed by the executable program instructions.

4. The method according to claim 1, wherein the NVM is a flash-EEPROM.

5. The method according to claim 1, wherein the data include one or more parameters, which are determined at the time of authentication and which are used to establish a protected channel between the chip card and the chip card terminal for the loading of the program instructions.

6. The method according to claim 5, wherein the parameter is a symmetric key, which is used by the chip card terminal and the boot loader for the transfer of the program instructions over the protected channel, in particular in that the program instructions are transferred in a manner encrypted by the symmetric key, and/or wherein the symmetric key is used by the boot loader to authenticate the chip card terminal.

7. The method according to claim 1, wherein the authorisation is verified on the basis of a certificate received by the chip card terminal in that an authorisation of the chip card terminal is specified for the loading of the program instructions.

8. The method according to claim 1, wherein, prior to the active operation, the boot loader is introduced into the ROM with the aid of a ROM mask and the boot loader has an authentication function for authenticating the personalisation facility, wherein the authentication of the personalisation facility to the boot loader is a precondition for the initial loading of the operating system into the NVM by the boot loader, wherein the boot loader is brought into the deactivated state by the personalisation facility after the initial loading of the operating system.

9. The method according to claim 1, wherein the authentication function is upgraded by the loading of the program instructions.

10. A chip card comprising a ROM, in which a boot loader is stored, and comprising an NVM, in which a chip card operating system is stored, wherein the boot loader in an active operation of the chip card can be started only by the chip card operating system in order to enable the loading of executable program instructions into the NVM of the chip card during active operation.

11. The chip card according to claim 10, wherein the boot loader has a first authentication function for authenticating a personalisation facility prior to the active operation in order to enable the initial loading of the operating system into the NVM, and wherein the chip card operating system has a second authentication function in order to authenticate a chip card terminal in order to enable the loading of the executable program instructions during active operation of the chip card by the boot loader, wherein the boot loader is designed such that there is no authentication of the chip card terminal by means of its first authentication function during active operation, and instead the boot loader, once it has been started by the chip card operating system, accesses a predefined memory region of the NVM in order to read data there which indicate a successful authentication of the chip card terminal by the chip card operating system.

12. The chip card according to claim 10, wherein first and second chip card operating systems are stored in the NVM of the chip card and a vector address is stored on the second chip card operating system so that the second chip card operating system is started when energy is coupled into the chip card.

13. The chip card according to claim 10, wherein the chip card is a document, in particular a document of value or a security document, wherein the document comprises a secured memory region in the NVM for storing at least one attribute and a communications interface for reading the attribute, wherein the chip card operating system has a cryptographic function for executing a cryptographic access protocol, the successful execution of which is a necessary precondition for external read access to the attribute.

14. The chip card according to claim 13, wherein the cryptographic access protocol is implemented on the part of the chip card by the second authentication function.

15. The chip card according to claim 13, wherein the document is a paper-based and/or plastic-based document, for example an electronic identity document, in particular a passport, identity card, visa, driver's license, vehicle registration document, vehicle title, company identification document, health insurance card, or another ID document, or a chip card, a means of payment, in particular a banknote, bank card or credit card, a consignment note, or another proof of authority, comprising an integrated data memory for storing the at least one attribute.

16. The chip card according to claim 10, wherein addresses for calling up an interface function and a memory function of the boot loader for the chip card operating system are stored in the NVM so that the interface function and the memory function of the boot loader can be called up during active operation by the chip card operating system.

17. An electronic system comprising a chip card according to claim 10 and comprising a chip card terminal, wherein the chip card terminal has a memory for storing the executable program instructions and a processor for reading the executable program instructions from the memory and for sending the executable program instructions via a secure channel to the chip card in order to load the executable program instructions into the NVM of the chip card, wherein the chip card terminal has program instructions for carrying out those steps of a cryptographic protocol which can be executed together with the second authentication function of the chip card operating system.

18. The electronic system according to claim 17, wherein the chip card and the chip card terminal each have a wireless interface, via which energy is coupled into the chip card from the chip card terminal and via which the secure channel is also established.

19. The electronic system according to claim 17, wherein the chip card terminal has a mechanical feed point for inserting the chip card into the chip card terminal so that the chip card remains in the chip card terminal during the loading of the executable program instructions and is only ejected again from the chip card terminal once the loading is complete.

\* \* \* \* \*